US008570569B2

(12) United States Patent
Takahashi

(10) Patent No.: US 8,570,569 B2
(45) Date of Patent: Oct. 29, 2013

(54) CONTROL DEVICE OF IMAGE FORMATION SYSTEM AND RECORDING MEDIUM STORING IMAGE FORMATION CONTROL PROGRAM

(75) Inventor: Yusaku Takahashi, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 263 days.

(21) Appl. No.: 13/076,298

(22) Filed: Mar. 30, 2011

(65) Prior Publication Data

US 2011/0242601 A1 Oct. 6, 2011

(30) Foreign Application Priority Data

Mar. 31, 2010 (JP) ................................. 2010-081540

(51) Int. Cl.
*G06F 3/12* (2006.01)
(52) U.S. Cl.
USPC ......... 358/1.15; 358/1.18; 358/450; 358/462; 358/540
(58) Field of Classification Search
USPC ............. 358/1.13, 1.15, 1.16, 1.18, 448, 450, 358/453, 462, 540
See application file for complete search history.

(56) References Cited

U.S. PATENT DOCUMENTS

| 5,519,392 A | 5/1996 | Oder et al. |
| 5,774,362 A | 6/1998 | Suzuki et al. |
| 2009/0214082 A1 | 8/2009 | Hoshi |
| 2009/0237712 A1 | 9/2009 | Shirai |
| 2009/0256626 A1 | 10/2009 | Hsieh et al. |
| 2009/0265626 A1 | 10/2009 | Suga |
| 2009/0310167 A1 | 12/2009 | Sugimoto |
| 2010/0103460 A1 | 4/2010 | Murayama et al. |
| 2010/0131903 A1 | 5/2010 | Thomson et al. |
| 2011/0242600 A1 | 10/2011 | Yanagawa |
| 2011/0293199 A1 | 12/2011 | Itakura |

FOREIGN PATENT DOCUMENTS

| CN | 1201184 A | 12/1998 |
| CN | 101005556 A | 7/2007 |
| JP | 2003-008866 A | 1/2003 |
| JP | 2009-216842 A | 9/2009 |
| JP | 2009-258966 A | 11/2009 |
| JP | 2009-302916 A | 12/2009 |

OTHER PUBLICATIONS

Seiko Epson Corp., "'Using the preview window' of Index.htm included in Epson Web-To-Page Utility v1.1aA," Feb. 1, 2007, available at http://www.epson.jp/dl_soft/readme/5411.htm, Sep. 2, 2010. (Partial translation enclosed.).

(Continued)

*Primary Examiner* — Vu B Hang
(74) *Attorney, Agent, or Firm* — Baker Botts L.L.P.

(57) ABSTRACT

When a user operates a control device which is connected to an image formation device, a first preview image corresponding to a mark-up text currently processed by a browser is displayed within a display area of a display device of the control device. When a user operation to a first item incorporated in the first preview image is detected, a second preview image of a second mark-up text which is linked to the first item is displayed in the display area. When an image formation with an image formation device is instructed, a composite image containing images corresponding to the first preview image and the second preview image is formed on a single output medium.

8 Claims, 8 Drawing Sheets

(56) References Cited

OTHER PUBLICATIONS

Canon Corp., "'Preview Screen' of top.htm included in ewpx-win-1_2_1-ea23.exe," available at http://cweb.canon.jp/pixus/pdf/index/nikkeipc.pdf (searched on Jan. 27, 2010). (Partial translation enclosed.).

Canon Information Systems Research Australia Pty. Ltd., "'Easy-WebPrint: Key Features' of product info window," available at http://www.canoneasywebprint.com/jp/, 2007 (searched on Jan. 27, 2010).

Hewlett-Packard Development Co., L.P., "'Automatic fixes:' Enhanced preview and print capabilities of hpsmartprint.chm included in HP_Smart_Web_Print_v4.6.exe," Mar. 2009, available at http://h10025.www1.hp.com/ewfrf/wc/document?lc=ja&dlc=ja&cc=jp&docname=c01418497 (searched on Jan. 27, 2010). (Partial translation enclosed.).

United States Patent and Trademark Office, Office Action for U.S. Appl. No. 13/076,072 (related U.S. patent application), mailed Mar. 7, 2013.

United States Patent and Trademark Office, Non-Final Office Action for U.S. Appl. No. 13/076,072 (related U.S. patent application), mailed Oct. 26, 2012.

Japan Patent Office, Notification of Reasons for Rejection for Japanese Patent Application No. 2010-124640 (related to above-captioned patent application), mailed May 14, 2013.

State Intellectual Property Office of the People'S Republic of China, Notification of First Office Action for Chinese Patent Application No. 201110085089.2 (counterpart to related patent application), mailed Jun. 28, 2013.

United States Patent and Trademark Office, Non Final Rejection for U.S. Appl. No. 13/850,928 (related to above-captioned patent application), mailed Jul. 16, 2013.

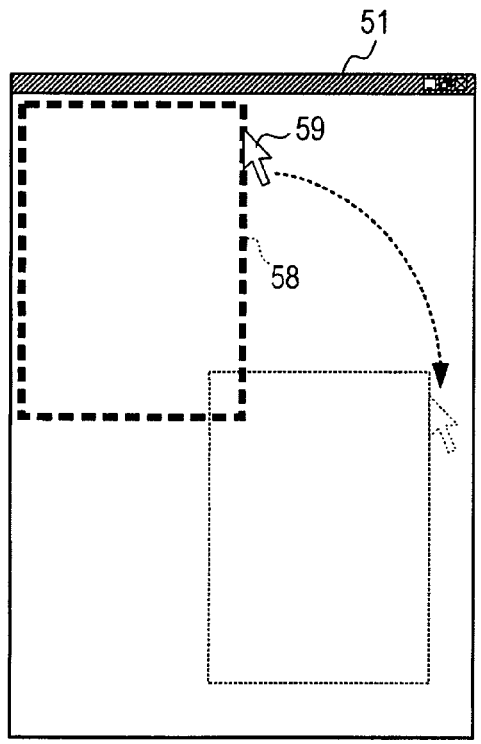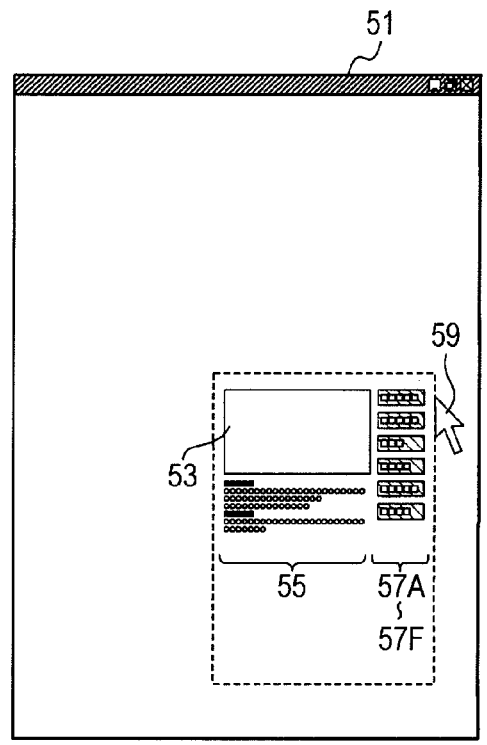
FIG. 7A    FIG. 7B
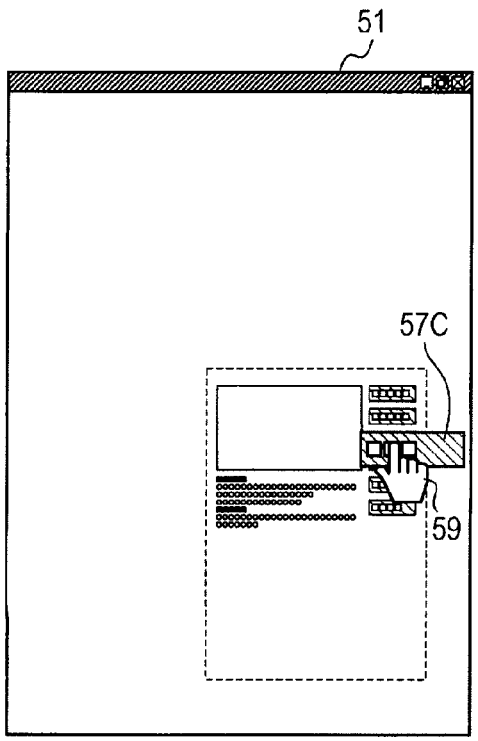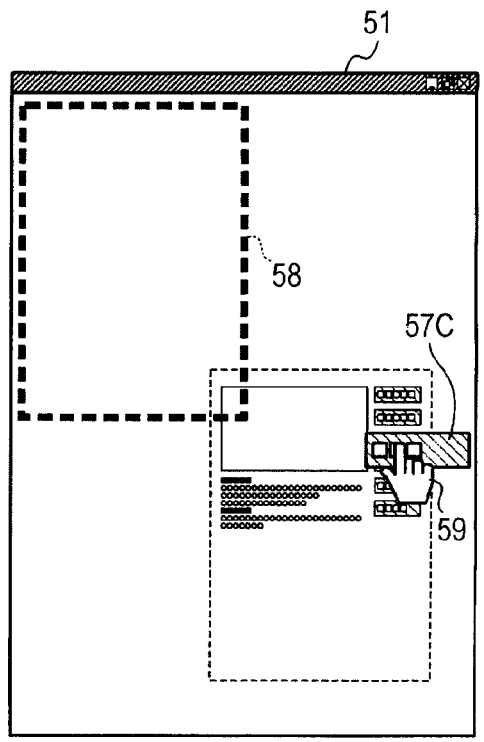
FIG. 7C    FIG. 7D

CONTROL DEVICE OF IMAGE FORMATION SYSTEM AND RECORDING MEDIUM STORING IMAGE FORMATION CONTROL PROGRAM

CROSS-REFERENCE TO RELATED APPLICATION

This application claims priority under 35 U.S.C. §119 from Japanese Patent Application No. 2010-081540 filed on Mar. 31, 2010. The entire subject matter of the application is incorporated herein by reference.

BACKGROUND

1. Technical Field

Aspects of the present invention relate to a control device of an image formation system configured to display a preview image and executes an image forming job of forming an image on an output medium such that the image formed on the output medium corresponds to the image displayed in the preview screen. Aspects of the present invention also relate to a computer readable recording medium storing an image formation program that realizes the above function of forming an image as displayed in the preview screen.

2. Related Art

Conventionally, a technique for displaying a preview image has been known. According to the conventional technique, when a user designates a link in the initial preview image and clicks the link, another preview image corresponding to the link is displayed. With use of such a technique, a user can view information of the link without releasing a preview mode and returning to a browsing mode before viewing a preview image of the linked information.

SUMMARY

In the conventional image formation apparatus as described above, link source information (i.e., the initially displayed preview image) and linked information can be printed individually. However, both pieces of information cannot be printed with laying out the same on a single output medium (e.g., on a single sheet of paper).

It is possible to apply a so-called n-up printing (or also known as an n-in-one printing) for reducing n pages of images and printing the same in one sheet. However, according to the conventional technique, it is impossible to lay out images representing the link source information and the images representing the linked information within a single output medium.

According to aspects of the invention, there is provided a control device provided with an image formation data creating unit configured to create image formation data, according to which an image formation device forming an image, the image formation data creating unit creating the image formation data based on mark-up text data containing item data representing items for display and image formation and link data representing link destinations associated with the items, first display data creating unit configured to create first display data representing a first preview image displayed on the display area, the first preview image indicating a position of a first item, which is represented by the item data contained in the first mark-up text data, on the output medium if the image formation device forms an image for the first image formation data created by the image formation data creating unit based on the first mark-up text data, a first preview display control unit configured to control the display device to display the first preview image based on the first display data in a first display area defined within a preview display area that is an area corresponding to an image formation area on the output medium, a user operation detecting unit configured to detect a first user operation performed with designating the first item arranged within the first preview, a data acquiring unit configured to identify a link destination which associated with the first item designated by the first user operation detected by the user operation detecting unit, and to acquire, from the identified link destination, second mark-up text data including second item data representing second item subjected to display and image formation, a second display data creating unit configured to create second display data representing a second preview image displayed on the display area, the second preview image indicating a position of a second item on the output medium, the second item being represented by the item data contained in the second mark-up text data if the image formation device forms an image based on the second image formation data created by the image formation data creating unit based on the second mark-up text data, a second preview display control unit configured to control the display device to display the second preview image in a second display area defined within a preview display area that is an area corresponding to an image formation area on the output medium, a composite image formation data creation unit configured to create composite image formation data according to which a composite image is formed on the single output medium, the composite image being configured such that the first item is arranged on the output medium at a position corresponding to the first display position and the second item is arranged on the output medium at a position corresponding to the second display position, and an image formation control unit configured to control the image formation device to operate in accordance with the composite image formation data.

According to aspects of the invention, there is provided a non-transitory computer accessible recording medium storing a computer program containing instructions that cause a computer to serve as a control device as described above.

BRIEF DESCRIPTION OF THE ACCOMPANYING DRAWINGS

FIGS. 7A-7D show a second operation (first variation) with the preview display.

DETAILED DESCRIPTION

Hereinafter, an exemplary embodiment according to aspects of the present invention will be described with reference to the accompany drawings.

Figure 1:
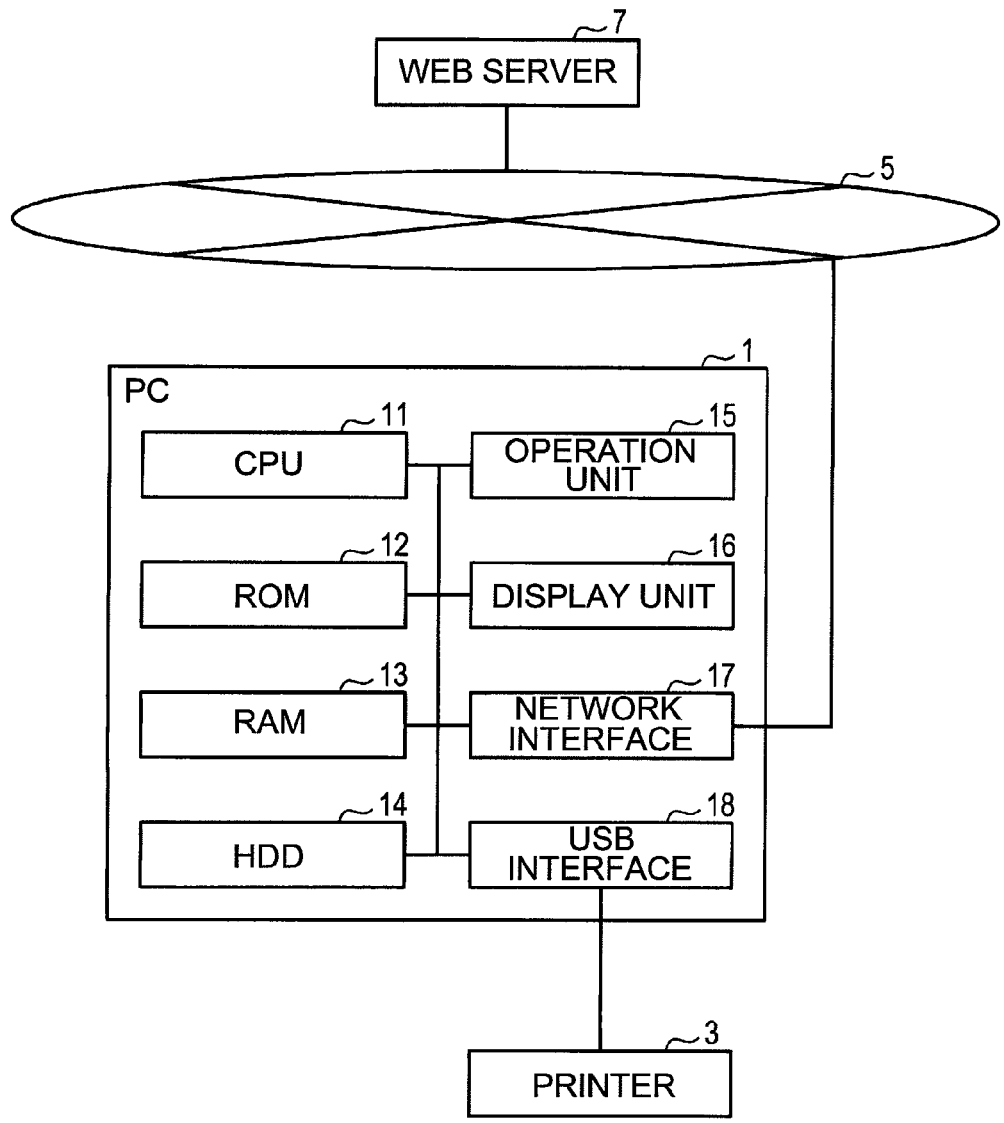
FIG. 1 is a block diagram showing a print system including a PC (Personal Computer) and a printer according to aspects of the invention.

A print system (FIG. 1) includes a personal computer (PC) 1 and a printer 3 connected to the PC 1. The PC 1 is capable of communicating with a web server 7 through a network 5 such as a WAN (Wide Area Network) or the Internet.

The PC 1 is provided with a CPU (Central Processing Unit) 11, a ROM (Read Only Memory) 12, a RAM (Random Access Memory) 13, an HDD (Hard Disk Drive) 14, an operation unit 15, a display unit 16, a network interface 17 and a USB (Universal Serial Bus) interface 18.

On the HDD 14, various kinds of software as well as an OS (Operating System) are stored. A web browser (described later) and plug-ins for the web browser are also stored on the HDD 14. When such programs are executed by the CPU 11, each program is retrieved from the HDD 14 and developed in the RAM 13.

The operation unit 15 includes a keyboard and pointing devices (e.g., a mouse). The display unit 16 has an LCD (Liquid Crystal Display).

A user of the PC 1 can start up the web browser by operating the operation unit 15 to input a certain command. When the web browser is started, by operating the operation unit 15, the user can designate URL (Uniform Resource Locator) to designate markup text data such as HTML (HyperText Markup Language), XHTML (Extensible HTML) or XML (Extensible Markup Language) to send a request for such data to the web server 7.

In response to such a request, the web server 7 returns markup text data. The PC 1 receives the thus returned markup text data and displays the markup text on the display unit 16.

When the markup text is displayed on the display unit 16, if the user inputs a command to print the markup text, through the operation unit 15, the PC 1 controls the printer 3 to print the markup text.

Before printing the markup text with the printer 3, the user can confirm how the markup text will be printed on an output medium using a preview function. A preview image is displayed on a preview display area defined on the display unit 16.

According to the embodiment, the web browser is configured such that various function can be additionally incorporated by installing programs called plug-ins. The preview function, which will be described in detail below, is also realized by a plug-in. The plug-in that realizes the preview function is implemented when the user inputs a command by operating the web browser to execute the preview function.

In the following description, as an example of a web page, ones shown in FIG. 5A or FIG. 5B will be referred to.

Figure 5A:
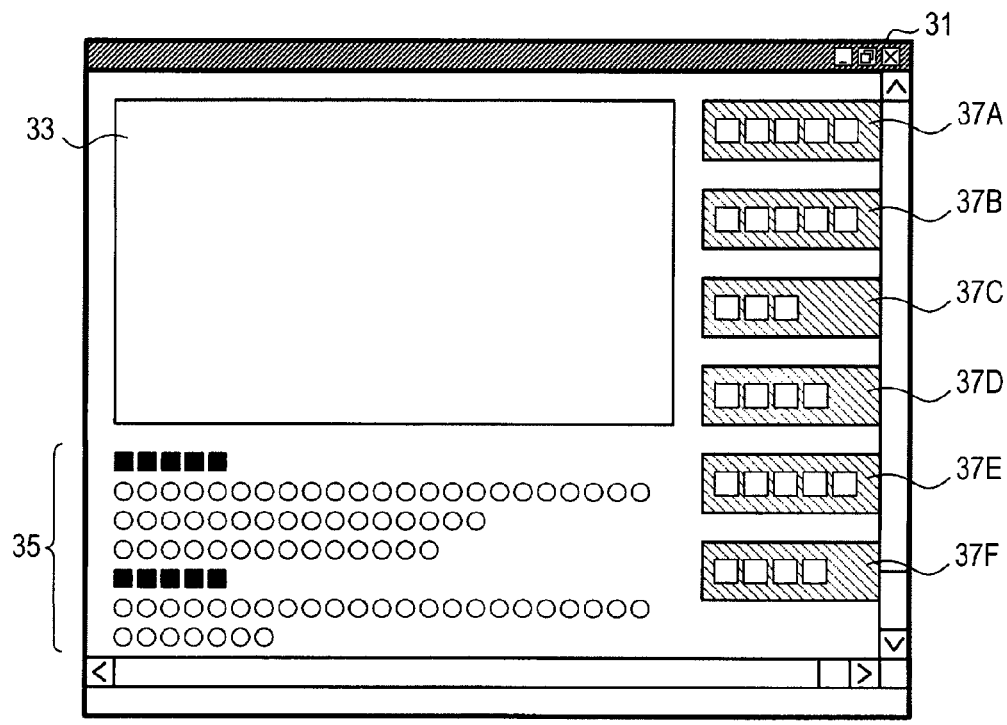
FIG. 5A shows an exemplary view of a first markup text.
Figure 5B:
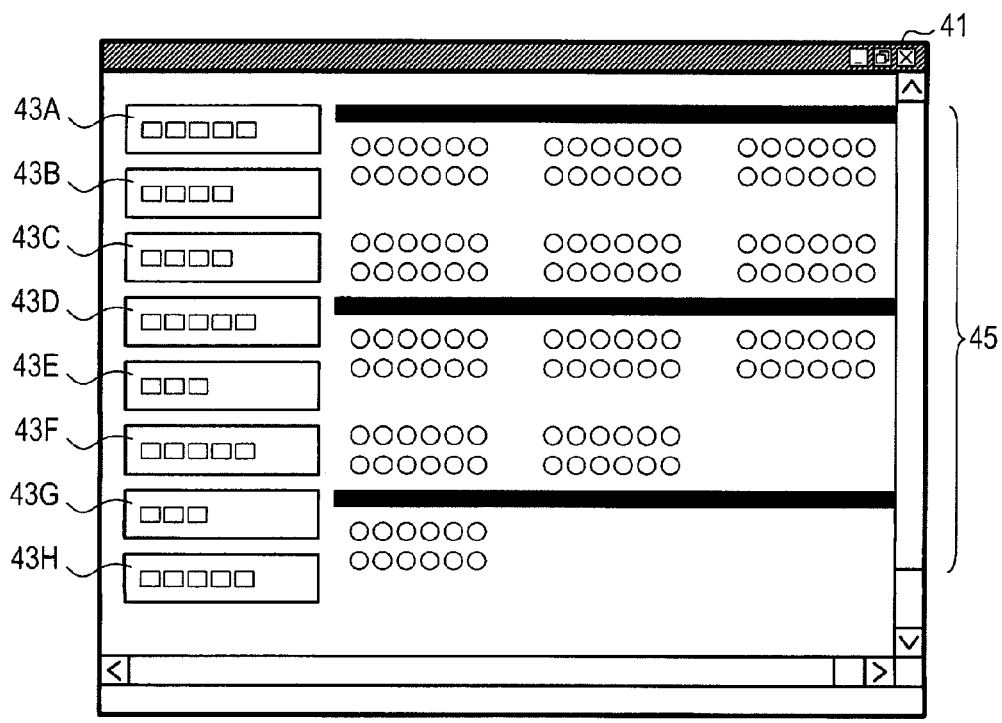
FIG. 5B shows an exemplary view of a second markup text.

The web page 31 shown in FIG. 5A includes an image 33, a text 35, images 37A-37F. To each of the images 37A-37F, a link URL (hyperlink) is associated. A web page 41 shown in FIG. 5B is a web page represented by a link associated to the image 37C. The web page 41 includes images 43A-43H and a text 45.

Figure 2:
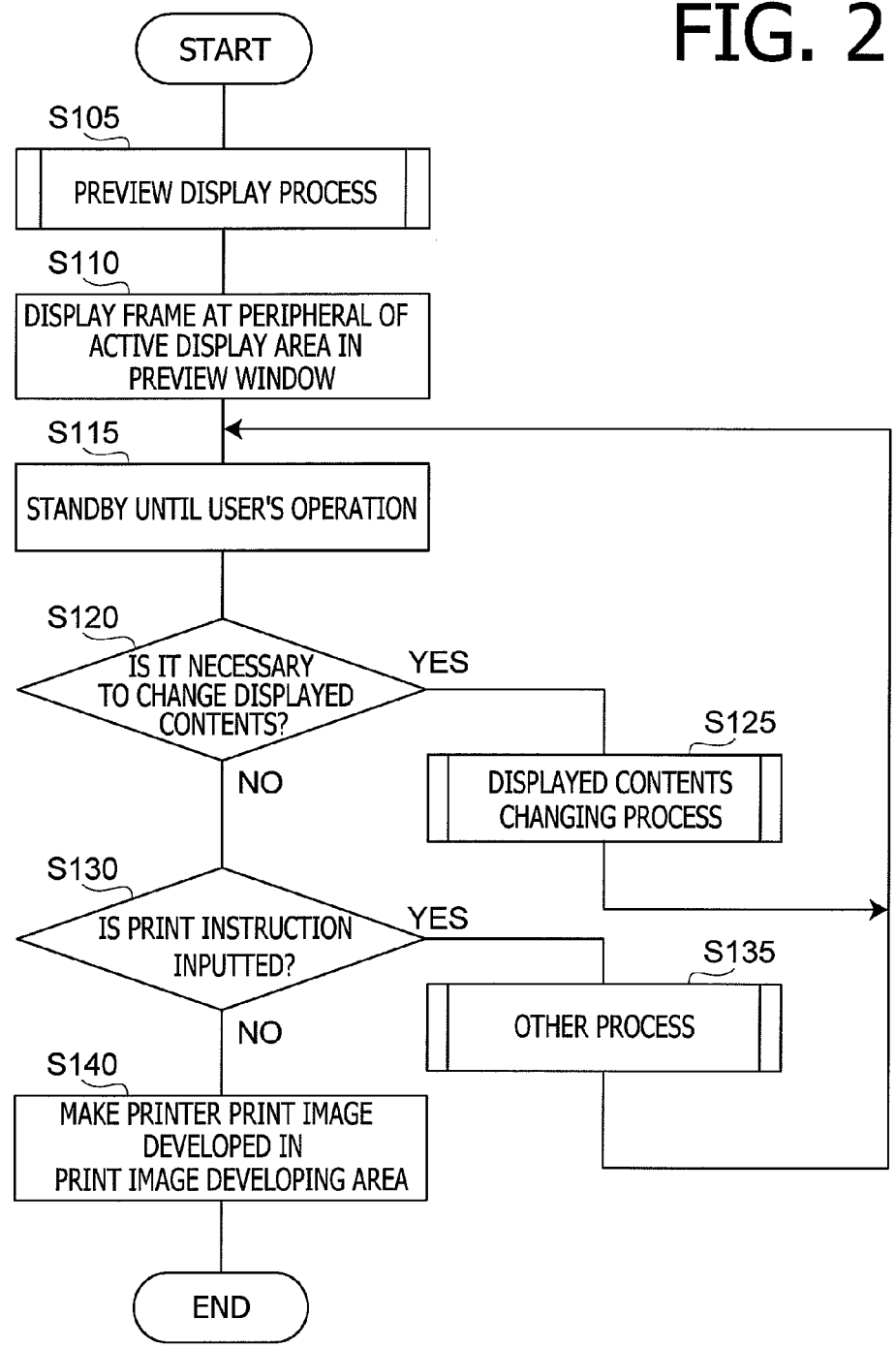
FIG. 2 is a flowchart illustrating a main process of a preview function according to aspects of the invention.

When the web page 31 (FIG. 5A) is displayed on the PC 1, if the user input a command to execute the preview function, the CPU 11 executes a mail process shown in FIG. 2. When the main process is started, the CPU 11 executes a preview display process (FIG. 3) for displaying a preview image of the web page which is currently displayed by the browser (S105).

In the preview display process (FIG. 3), the CPU 11 obtains all the data configuring the web page to be processed (S205). In S205, the markup text data which has already been obtained from the web server 7 and stored in a memory for display by the browser is additionally stored in another memory so that it can be referred to in the following steps.

The data stored in the other memory may be the same as the data obtained from the browser, but may be a part of the data necessary for displaying the preview image. Alternatively, the data same as the browser stores may be obtained directly from the web server 7.

Next, the CPU 11 obtains the print settings (S210), which include print settings set through the browser and/or the print settings having been set to the printer driver. It should be noted that the CPU 11 may obtain the print settings for both of or one of the browser and the print settings for the printer driver. Examples of the print settings include a printing sheet size, a print resolution, a color/monochromatic setting and the like.

Next, the CPU 11 searches the data items of the web page subject to be processed for unprocessed data items (S215). The term "data items" here means texts, still images and movies arranged in the web pages. The data obtained in S205 includes at least one description representing the data item. Therefore, in S215, the CPU 11 searches the data items in the order of description and detects one unprocessed data item. Further, the data of the web page includes descriptions indicating how the data items are arranged in the web page. Such descriptions are made in association with the descriptions of the data items.

If the CPU 11 detects the unprocessed data item (S220: YES), the CPU 11 develops an image corresponding to the unprocessed data item in the print image developing area in accordance with the descriptions contained in the data and print settings (S225). Thus, if the CPU 11 detects a text as the data item, the text is developed as an image in the print image developing area, and if the CPU 11 detects an image is the data item, the CPU 11 develops the image in the print image developing area.

The print image developing area is a virtual area defined on the memory for developing an image. The virtual image developing area is managed by the OS of the PC 1. Specifically, when an image is developed in the virtual area, the CPU 11 calls an image drawing command provided by the OS, then the data corresponding to the image drawing command is developed in the virtual area (image developing area).

When the image drawing command is issued in S225, the CPU 11 sets the parameters when issuing the image drawing command taking the print settings obtained in S210 into account. For example, if the monochromatic print is set in the print settings, the CPU 11 issues the image drawing command with setting the parameters representing the monochromatic print. With this control, even if the data item subject to be printed represents a color image, the data representing the monochromatic image is developed in the print image developing area.

After developing an image of one data item subject to be printed is developed in the print image developing area, the CPU 11 judges whether a link destination is set to the data item subjected to be printed (S230).

If the link destination is set (S230:YES), the CPU 11 stores the link destination in a list (S235). The list is used in a step described later, and the CPU 11 stores a pair of pieces of information:

information representing coordinates of a position, in the print image developing area, where the image corresponding to the data item corresponding to the link is developed; and information representing a URL of the link destination.

If step S235 has been finished, or if the CPU 11 judges that no link is set to the data item (S230: NO), the CPU 11 returns to S215. While the decision at S220 is affirmative, steps S215-S235 are repeated and the above-described process is executed for the unprocessed data items one by one.

When all the unprocessed data items have been processed (S220: NO), the CPU 11 develops the image, which has been developed in the print image developing area, in the preview image developing area (S240). In S240, the CPU 11 develops the image in the preview image area with taking the difference of a size of the image in the print image developing area and the size of the image in the preview image area (i.e., reduced or expanded, if necessary).

Figures 6A, 6B:
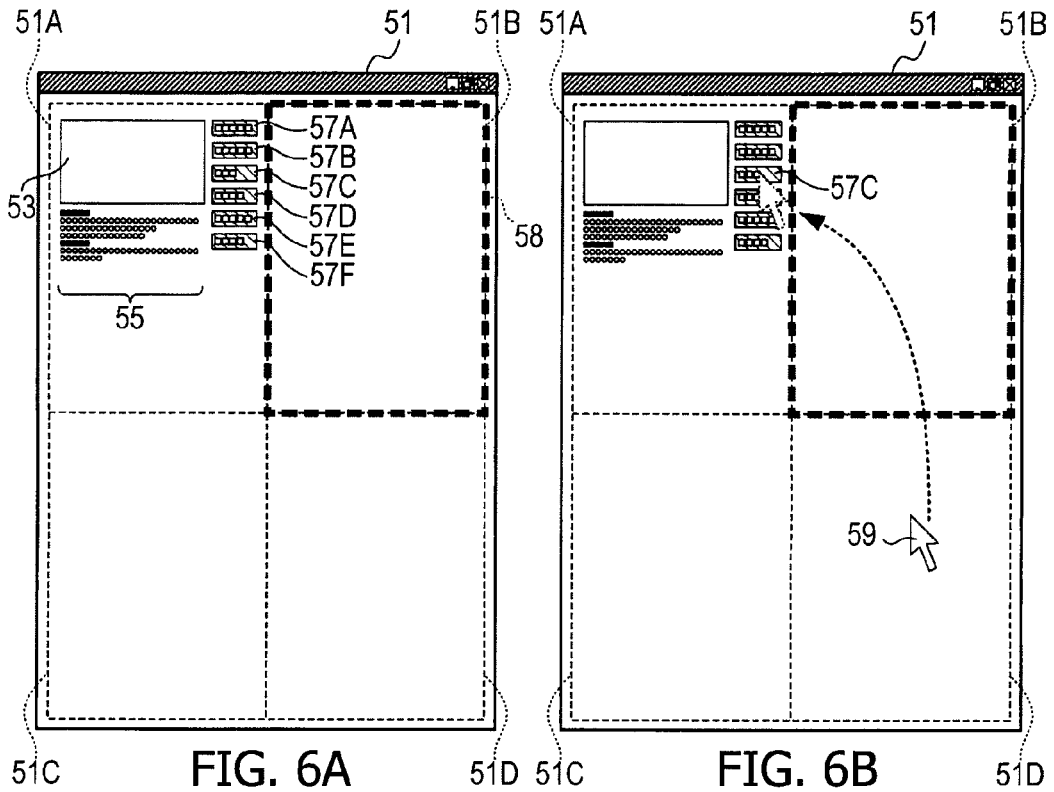
FIGS. 6A-6D show a first operation with a preview display.

Next, the CPU 11 displays the image developed in the preview image drawing area in the active display area (S245). For example, as shown in FIG. 6A, a preview display area 51 is divided into four subareas. The number of the divided areas need not be limited to four. In this embodiment, simply for the purpose of description, the preview display area 51 is divided in four subareas 51A-51D.

Firstly, one of the subareas 51A-51D is selected as an active subarea. It should be noted that any one of the subareas 51A-51D can be selected as the active subarea. In the exemplary embodiment described hereinafter, priority is assigned to the four subareas 51A, 51B, 51C and 51D in this order, and one having the highest priority among the subareas in which the preview image is not displayed is selected as the active subarea. In the following description, it is assumed that the subarea 51A has been selected as the active subarea. It should be noted that, based on a user operation, any one of the four subareas 51A-51D can be selected as the active subarea regardless of the priority.

In S245, the CPU 11 displays a preview image 53 corresponding to the image 33 to be printed, a preview image 55 corresponding to the text 35 to be printed, preview images 57A-57F corresponding to the images 37A-37D to be printed and the like in the subarea 51A as shown in FIG. 6A. As described above, a preview image corresponding to the text subjected to be printed is also displayed in the subarea 51A.

After displaying the preview image 51 as shown in FIG. 6A by executing S245, the CPU 11 searches from among the links registered with the list in S235 for an unprocessed link destination (S250).

If the CPU 11 detects an unprocessed link destination (S255: YES), the CPU 11 recalculates the coordinates of the position at which the linked data item in accordance with the selected preview subarea (S260). Then, the CPU 11 updates the list that was stored in S235 such that the coordinates of the display position of the linked data item and the linked URL are associated with each other. Then, the CPU 11 arrange a clickable control at the recalculated coordinates (S265).

The arranged control is a transparent (invisible) control so that the images having been displayed are not covered with the control since the control is for detecting a click operation using a pointing device (e.g., a mouse).

After S265, the CPU 11 returns to S250. As a result, while the decision at S255 is affirmative, steps S250-S265 are repeated and unprocessed links are processed subsequently.

Figure 3:
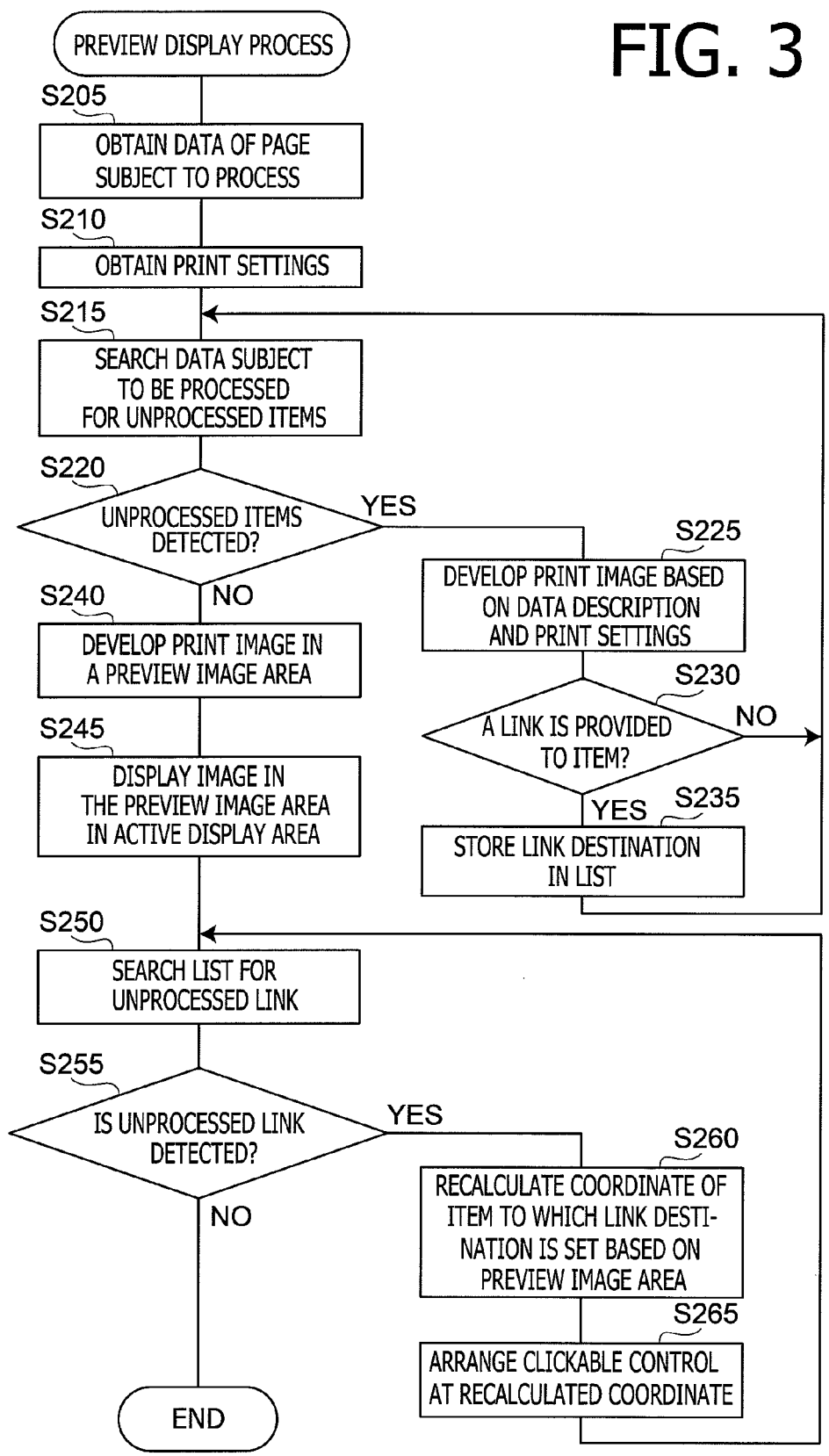
FIG. 3 is a flowchart illustrating a preview display process according to aspects of the invention.

When all the unprocessed links are processed (S255: NO), the process shown in FIG. 3 is finished and the CPU 11 proceeds to S110 shown in FIG. 2.

In S110, the CPU 11 displays a frame around the active display area within the preview window. If an image has been displayed in the subarea 51A in S245, the active display area is changed to an area other than the subarea 51A. In the following description, it is assumed that the active area is changed to the subarea 51B.

When the active display area is changed to the subarea 51B, a frame 58 is displayed (see FIG. 6A) around the subarea 51B. Further, a control is arranged to overlap the frame 58. With the frame 58, the user can recognize that the subarea 51B is the active display area.

Figure 4:
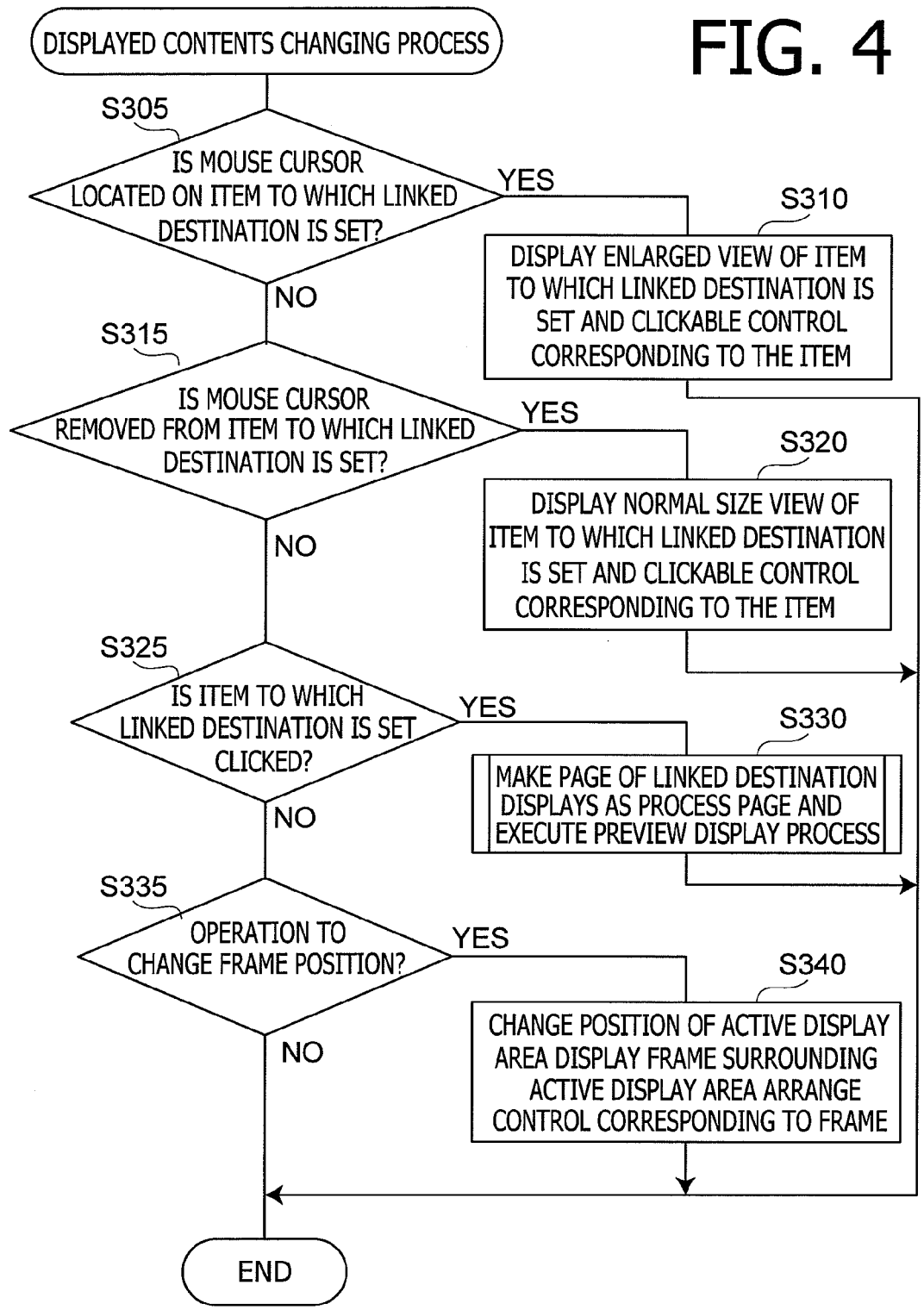
FIG. 4 is a flowchart illustrating a displayed contents change process according to aspects of the invention.

When S110 is completed, the CPU 11 awaits another user operation (S115). When a user input is detected, the CPU 11 judges whether the displayed contents should be changed (S120). If the CPU 11 judges that the displayed contents should be changed (S120: YES), the CPU 11 executes a displayed contents changing process (S125), which is shown in FIG. 4.

In S305 (see FIG. 4), the CPU 11 judges whether the mouse cursor is located at an item to which a link is set. Specifically, as shown in FIG. 6B, if the mouse cursor 59 is moved as indicated by dotted line by a user, the mouse cursor 59 overlaps with an image 57C to which a link is set.

Specifically, at a position where the image 57C is located, a control was arranged in S265. When the mouse cursor 59 overlaps with the control located at the image 57C, the CPU 11 detects an event "mouse hover" which is issued by the OS. Thus, the CPU 11 judges that the mouse cursor 59 overlaps with the item to which the link destination is assigned when the "mouse hover" event is detected, and when the location designated by the mouse cursor 59 and the location where the item to which the link destination is set is displayed coincide with each other.

If the mouse cursor 59 overlaps on the item to which the link destination is set (S305: YES), the CPU 11 displays the item to which the link destination is set and the clickable control corresponding to the item in an enlarged manner (S310), and finishes the process shown in FIG. 4.

Figures 6C, 6D:
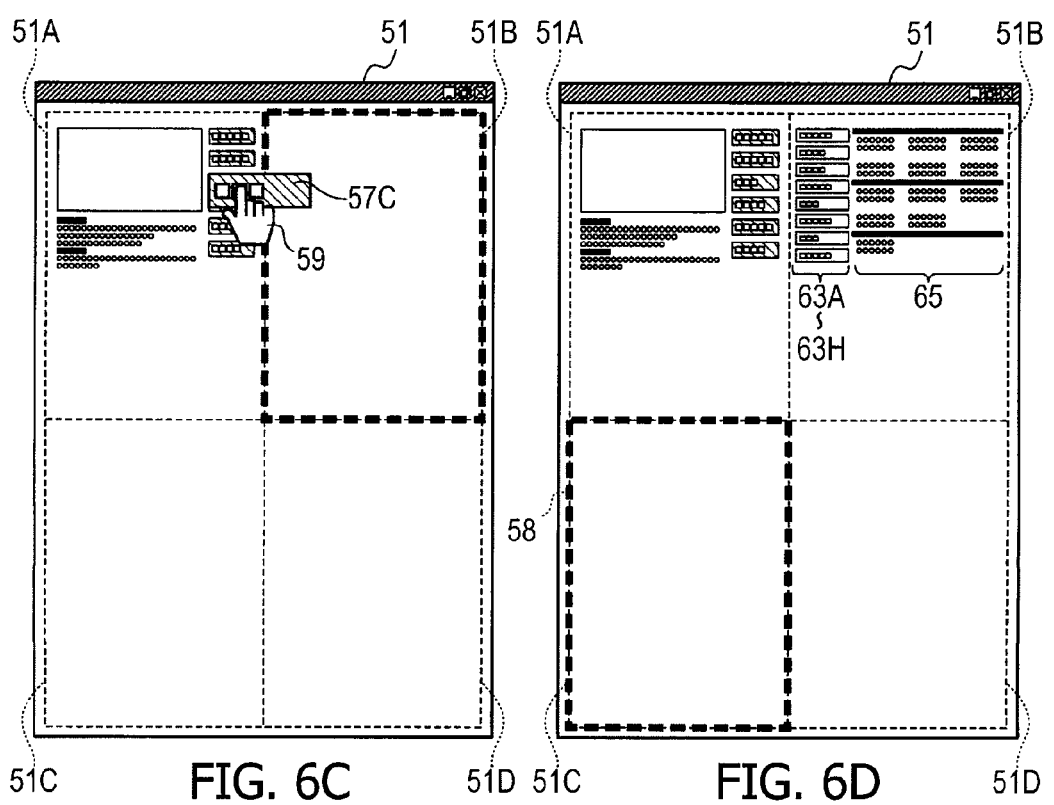

As S310 is executed, the image 57C which is the item to which the link destination is set is displayed in an enlarged manner (see FIG. 6C). Therefore, even if the image 57C was displayed in a reduced manner in comparison with the original image 37C, the user can check the displayed contents of the image 57C easily. In S310, a process of modifying the shape of the mouse cursor 59 is also executed so that the user can recognize that the image 57C is clickable.

If the judgment at S305 is negative (S305: NO), the CPU 11 judges whether the mouse cursor 59 is moved away from the item to which the link destination is set (S315). If the mouse cursor 59 is moved away from the control that is arranged to overlap with the item to which the link destination is set, the CPU 11 detects an event "mouse leave" which is issued by the OS.

Thus, in S315, if the enlarged view of the item 57 is displayed and the mouse leave event is detected, the CPU 11 judges that the mouse cursor 59 is moved away from the item to which the link destination is set.

When the CPU 11 judges that the mouse cursor 59 is moved away from the item to which the link is set (S315: YES), the CPU 11 reduces the display size of the item to which the link destination is set and the corresponding clickable control to the original size (S320) and finishes the process of FIG. 4.

When the judgment at S315 is negative (S315: NO), the CPU 11 judges whether the item to which the link destination is set is clicked (S325). As described above, also in S325, the CPU 11 judges whether the image 57C is clicked using the transparent control arranged to overlap with the image 57C.

When the item to which the link destination is set is clicked (S325: YES), the CPU 11 refers to the list updated in S260 and executes a preview displaying process for displaying a preview image of the web page to which the item is linked, and the CPU 11 finishes the process shown in FIG. 4. It should be noted that the preview display process (S330) is substantially equal to the process shown in FIG. 3.

When the data of the web page subjected to be processed is acquired in S205 (FIG. 3), the mark-up language document data, which the browser has not yet acquired from the web server 7, is to be processed. In such a case, therefore, the mark-up language document data is acquired from the web server 7. The other process is similar to that shown in FIG. 3 and will be omitted for brevity.

As a result of execution of S330, in the active display area 51B, display images 63A-63H corresponding to the print images 43A-43H, display image 65 corresponding to the text 45 to be printed are displayed. The frame 58 indicating the active display area is moved to indicate the divided area 51C.

If the judgment in S325 is negative (S325: NO), the CPU 11 judges whether the user operation is for changing the position of the frame 58 (S335). As described before, a control is arranged to overlap with the frame 58 in S110, the CPU 11 is capable of detecting a drag & drop operation to the frame 58.

Therefore, if such an operation is detected (S335:YES), the CPU 11 judges that the position where the drop operation is executed is the position of the active display area, changes the active display area, displays the frame 58 surrounding the active display area, arranges a control corresponding to the frame 58 (S340), and finishes the process shown in FIG. 4. If the judgment in S335 is negative, the CPU 11 finishes the process shown in FIG. 4 without executing S340.

When the process shown in FIG. 4 is finished, the CPU 11 returns to S115 (FIG. 2). While the judgment at S120 is affirmative, steps S115-S125 are repeated. Therefore, the process shown in FIG. 4 is repeated depending on the user operation.

If the judgment in S120 is negative, the CPU 11 judges whether a print execution is instructed (S130). If the print execution is not instructed (S130: NO), the CPU 11 executes another process corresponding to an instruction (S135), and returns to S115. Various processes could be executed at S135, however, such processes are not necessary to describe the present invention and description thereof will be omitted for brevity.

If the judgment in S120 is affirmative, the CPU 11 develops the images to be printed in the print image developing areas such that items displayed in the divided area 51A will be printed on an upper left divided area of four divided print areas, which are areas defined by dividing an entire print area, items displayed in the divided area 51B will be printed on an upper right divided print area, the items displayed in the divided area 51C will be printed on a lower left divided print area, and the items displayed in the divided area 51D will be printed on a lower right divided print area.

Then, the CPU 11 controls the printer 3 to print the images developed in the print image developing areas (S140), and finishes the process shown in FIG. 2. As a result, a composite image containing the web pages of the link sources and the web pages of the link destinations are arranged as shown in FIG. 6D is printed on a single output media (e.g., a sheet of paper) and output by the printer 3.

As described above, as the PC 1 executes S105, the first preview image (i.e., the image in the divided are 51A in FIG. 6D) is displayed in the first image displaying position (i.e., the divided area 51A) defined within the preview image display area 51.

Further, as the PC 1 executes S325-S330, when the user designates the image 57C arranged in the first preview image and clicks the same, the second preview image (i.e., the image shown in the divided area 51B of FIG. 6D) corresponding to the web page of the linked destination is displayed in the second image displaying position (i.e., the divided area 51B).

Further, as the PC 1 executes S130-S140, the printer 3 is controlled such that the composite image formation data for printing the image corresponding to the first and second preview images arranged at positions corresponding to the first and second preview images can be printed.

Therefore, after the first preview image is displayed, the second preview image can be displayed without extinguishing the first preview image. Further, the images corresponding to the first and second preview images can be formed (printed) on the single output medium (e.g., a sheet of paper).

It should be noted that the invention needs not be limited to the above-described exemplary embodiment, but can be modified in various ways without departing from the scope of the invention.

For example, in the exemplary embodiment described above, the preview image displaying area 51 is divided into four sub areas in advance as shown in FIG. 6A, and the active display area is selected from the four sub areas. This configuration can be modified such that a user-desired portion within the preview display area 51 is set as the active display area.

Such a modification is described with reference to FIGS. 7A-7D. That is, in order to enable the above configuration, firstly, the CPU 11 displays the frame 58 and acquires a drag & drop operation of the user as shown in FIG. 7A. If the user performs the drag & drop operation to move the frame 58 as indicated in FIG. 7A by dotted lines, the CPU 11 displays the preview image (S105) at the position where the user drops the frame 58 as shown in FIG. 7B. Thereafter, if the user performs a click operation on the image 57C of the preview image as shown in FIG. 7C, the CPU 11 displays the frame 58 again as shown in FIG. 7D and acquires the drag & drop operation of the user to move the frame 58.

Figure 8A:
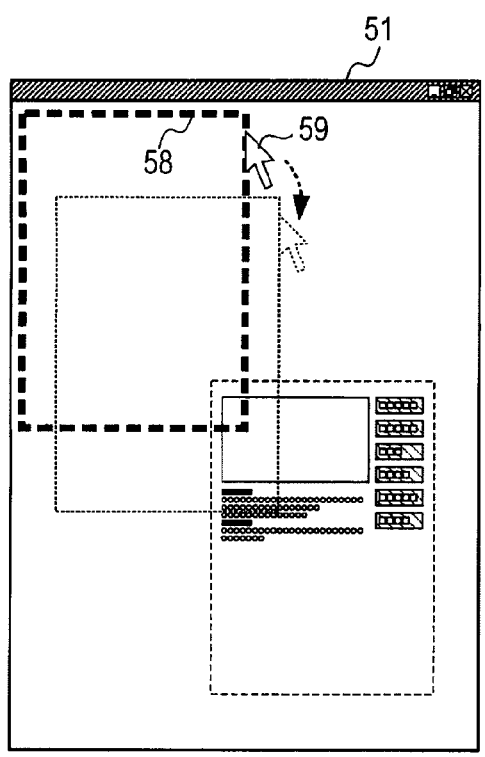
FIGS. 8A-8B show a second operation (second variation) with the preview display.
Figure 8B:
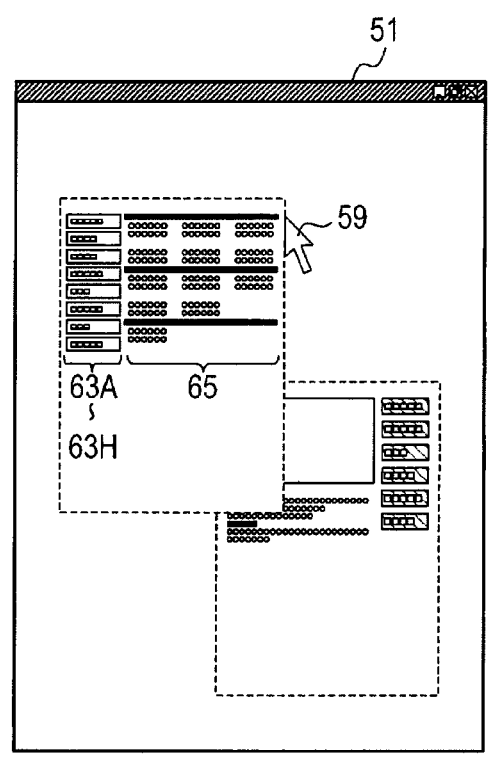

If the user performs the drag & drop operation to move the frame 58 as shown in FIG. 8A, the CPU 11 displays the preview image (S330) at the position where the user drops the frame 58 as shown in FIG. 8B.

According to the above configuration, the user can freely arrange a plurality of preview images within the preview display area 51. That is, the user can compose a desired composite image and make the printer to output the same. It should be noted that, in S140, the print images area developed with retaining the positional relationship of the preview images displayed in the preview display area 51.

According to the exemplary embodiment, when the web page displayed by the browser is subject to be the target to be processed and a preview image is displayed, the preview is displayed in an active sub (divided) area. If the web page displayed by the browser is subject to be processed, the preview image may be displayed in the entire area of the preview display area. In such a case, if a control to which a link is associated is clicked, the process is modified to select an active sub area for the web page displayed by the browser and another active sub area for the linked web page, and display the preview images in the respective sub areas.

In the exemplary embodiment, in S325, the CPU 11 judges whether the user clicks on the item to which a link destination is assigned by using a control that is overlapped with the item to which the link is associated. However, the invention needs not be limited to such a configuration. If the CPU can recognize coordinates of a position at which the click is made and can judge whether the click is done at the position where an item is displayed, another method may be employed. For example, the judgment may be made based on an event indicating the coordinates of the position where the click is done.

In the exemplary embodiment, the print image developed in the print image area S225 is developed in the preview area in S240. However, instead of developing in the print area, the image may be developed in the preview area in S225. Execution of S225 is done at a position where S240 is done and S240 may be omitted. Alternatively, S225 is executed as is and S240 may be omitted.

According to the exemplary embodiment, programs causing the PC 1 to execute the above-described processes are incorporated as plug-ins. However, the invention needs not be limited to such a configuration and the browser has such functions without any plug-ins. Alternatively, another type of programs such as a printer driver which are incorporated in the OS may have a function to execute such processes.

In the exemplary embodiment, the printer 3 is described as an example of the image forming device. However, the invention is applicable to devices using a display medium instead of a printing medium. That is, the invention is applicable to non-printing devices having software capable forming images on electronic paper or virtual medium (e.g., PDF file).

In the exemplary embodiment, the PC 1 and the printer 3 are separate devices. However, the invention needs not be limited to such a configuration, but is applicable to a device which is configured such that a user interface similar to that employed in the PC 1 is implemented in a device having a function of the printer 3.

What is claimed is:

1. A control device, comprising:
    an image formation data creating unit configured to create image formation data, according to which an image formation device forming an image, the image formation data creating unit creating the image formation data based on mark-up text data containing item data representing items for display and image formation and link data representing link destinations associated with the items;
    a first display data creating unit configured to create first display data representing a first preview image displayed on the display area, the first preview image indicating a position of a first item, which is represented by the item data contained in the first mark-up text data, on the output medium if the image formation device forms an image based on the first image formation data created by the image formation data creating unit based on the first mark-up text data,
    a first preview display control unit configured to control the display device to display the first preview image based on the first display data in a first display area defined within a preview display area that is an area corresponding to an image formation area on the output medium;
    a user operation detecting unit configured to detect a first user operation performed with designating the first item arranged within the first preview;
    a data acquiring unit configured to identify a link destination which associated with the first item designated by the first user operation detected by the user operation detecting unit, and to acquire, from the identified link destination, second mark-up text data including second item data representing second item subjected to display and image formation;
    a second display data creating unit configured to create second display data representing a second preview image displayed on the display area, the second preview image indicating a position of a second item on the output medium, the second item being represented by the item data contained in the second mark-up text data if the image formation device forms an image based on the second image formation data created by the image formation data creating unit based on the second mark-up text data;
    a second preview display control unit configured to control the display device to display the second preview image in a second display area defined within a preview display area that is an area corresponding to an image formation area on the output medium;
    a composite image formation data creation unit configured to create composite image formation data according to which a composite image is formed on the single output medium, the composite image being configured such that the first item is arranged on the output medium at a position corresponding to the first display position and the second item is arranged on the output medium at a position corresponding to the second display position; and
    an image formation control unit configured to control the image formation device to operate in accordance with the composite image formation data.

2. The control device according to claim 1,
    wherein the user operation detection unit detects a second user operation if one of an operation to select one of a plurality of predetermined position within the preview area as the second display position and an operation to designate a position within the preview area as the second display position, and
    wherein the second preview display unit controls the display unit to display the second preview image in the second display position detected by the user operation detection unit as a result of the second user operation.

3. The control device according to claim 2,
    wherein the user operation detection unit detects a third user operation if one of an operation to select one of a plurality of predetermined position within the preview area as the first display position and an operation to arbitrarily designate a position within the preview area as the first display position, and
    wherein the first preview display unit controls the display unit to display the first preview image in the first display position detected by the user operation detection unit as a result of the third user operation.

4. The control device according to claim 3,
    wherein the user operation detection unit detects a fourth user operation if the user performs a fourth operation to move a cursor to a target item, which is an item included in the items arranged within the first preview image, and an item of which the link data indicating the link destination associated with the item is included in the first mark-up text data, and
    wherein the image formation system further comprises an enlarging control unit configured to display an enlarged view of the item arranged at the position where the cursor overlaps if the user operation detection unit detects the fourth user operation.

5. A non-transitory computer accessible recording medium storing a computer program containing instructions that cause a computer to serve as a control device of an image formation system,
    wherein the control device comprises:
    an image formation data creating unit configured to create image formation data, according to which an image formation device forming an image, the image formation data creating unit creating the image formation data based on mark-up text data containing item data representing items for display and image formation and link data representing link destinations associated with the items;
    a first display data creating unit configured to create first display data representing a first preview image displayed on the display area, the first preview image indicating a position of a first item, which is represented by the item data contained in the first mark-up text data, on the output medium if the image formation device forms an image based on the first image formation data created by the image formation data creating unit based on the first mark-up text data, a first preview display control unit configured to control the display device to display the first preview image based on the first display data in a first display area defined within a preview display area that is an area corresponding to an image formation area on the output medium;

a user operation detecting unit configured to detect a first user operation performed with designating the first item arranged within the first preview;

a data acquiring unit configured to identify a link destination which associated with the first item designated by the first user operation detected by the user operation detecting unit, and to acquire, from the identified link destination, second mark-up text data including second item data representing second item subjected to display and image formation;

a second display data creating unit configured to create second display data representing a second preview image displayed on the display area, the second preview image indicating a position of a second item on the output medium, the second item being represented by the item data contained in the second mark-up text data if the image formation device forms an image based on the second image formation data created by the image formation data creating unit based on the second mark-up text data;

a second preview display control unit configured to control the display device to display the second preview image in a second display area defined within a preview display area that is an area corresponding to an image formation area on the output medium;

a composite image formation data creation unit configured to create composite image formation data according to which a composite image is formed on the single output medium, the composite image being configured such that the first item is arranged on the output medium at a position corresponding to the first display position and the second item is arranged on the output medium at a position corresponding to the second display position; and an image formation control unit configured to control the image formation device to operate in accordance with the composite image formation data.

6. The recording medium according to claim 5, wherein the user operation detection unit detects a second user operation if one of an operation to select one of a plurality of predetermined position within the preview area as the second display position and an operation to designate a position within the preview area as the second display position, and wherein the second preview display unit controls the display unit to display the second preview image in the second display position detected by the user operation detection unit as a result of the second user operation.

7. The recording medium according to claim 6, wherein the user operation detection unit detects a third user operation if one of an operation to select one of a plurality of predetermined position within the preview area as the first display position and an operation to arbitrarily designate a position within the preview area as the first display position, and wherein the first preview display unit controls the display unit to display the first preview image in the first display position detected by the user operation detection unit as a result of the third user operation.

8. The recording medium according to claim 7, wherein the user operation detection unit detects a fourth user operation if the user performs a fourth operation to move a cursor to a target item, which is an item included in the items arranged within the first preview image, and an item of which the link data indicating the link destination associated with the item is included in the first mark-up text data, and wherein the image formation system further comprises an enlarging control unit configured to display an enlarged view of the item arranged at the position where the cursor overlaps if the user operation detection unit detects the fourth user operation.

* * * * *